W. J. & P. M. FORSTER.
PLUMBING JOINT FITTING AND ATTACHMENT.
APPLICATION FILED NOV. 29, 1907.

939,001.

Patented Nov. 2, 1909.

WITNESSES:

INVENTORS:
William J. Forster
and Percy M. Forster;
BY
Geo. H. Strong.
ATTORNEY

UNITED STATES PATENT OFFICE.

WILLIAM J. FORSTER AND PERCY M. FORSTER, OF BERKELEY, CALIFORNIA.

PLUMBING JOINT-FITTING AND ATTACHMENT.

939,001.

Specification of Letters Patent. Patented Nov. 2, 1909.

Application filed November 29, 1907. Serial No. 404,276.

*To all whom it may concern:*

Be it known that we, WILLIAM J. FORSTER and PERCY M. FORSTER, citizens of the United States, residing at Berkeley, in the county of Alameda and State of California, have invented new and useful Improvements in Plumbing Joint-Fittings and Attachments, of which the following is a specification.

Our invention relates to forming joint attachments which are especially designed where connections are to be made through floors, and its object is to render said connections more convenient, accessible and safe from loss.

It consists in a combination and arrangement of parts which will be more fully explained by reference to the accompanying drawings.

Figure 1:
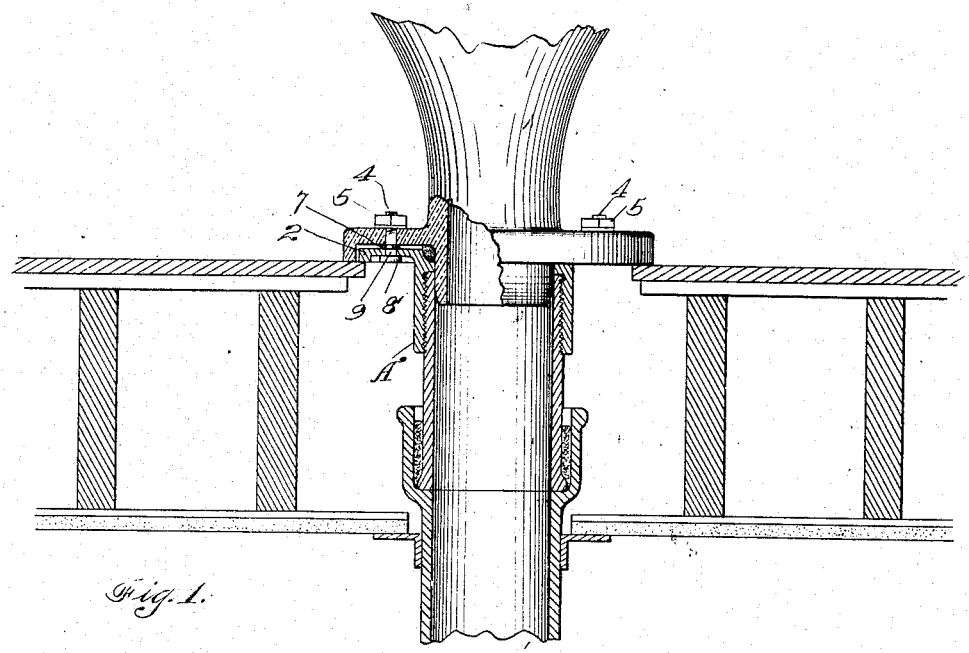
Figure 3:
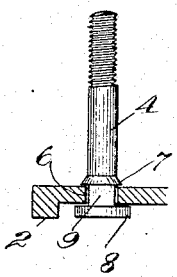
Figure 2:
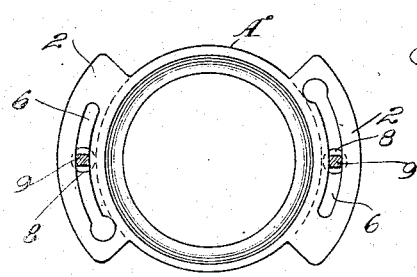

Figure 1 is a sectional view of the device as applied. Fig. 2 is a plan view. Fig. 3 is a detail view of the fastening screw.

In Patent No. 858,865 issued to us July 2, 1907, we have shown a closet bowl or other device having what is termed a "floor flange", and a joint fitting to connect said bowl discharge with the escape pipe or conductor, and form a joint therewith; said joint flange being fitted to and secured beneath the floor flange of the bowl. The connection between these two is usually effected by bolts entered from below, and having nuts upon the upper ends by which to secure the parts together. If it is necessary or desirable to remove the bowl the nuts are first unscrewed, and under ordinary conditions the bolts are liable to drop out, and be lost in the space below the floor, and when such fitting is employed in conjunction with joints which have to be calked, it is difficult to obtain access to such joints on account of the flange of the fitting being interposed.

In our present invention, we make the fitting A with an interior concaved groove at the junction of the body of the fitting and the flange, and within this groove is fitted a gasket which is compressed between the junction of the angle and the bowl flange to form a tight joint. As it is frequently desirable to introduce a calking tool to form a joint at some point beneath these flanges, we have shown the flange 2 of the fitting A as cut away upon two sides, leaving a sufficient portion of the flange, preferably upon opposite sides of the fitting, to secure it to the bowl flange. The space thus left between the ends of the flange segments, is sufficient for the introducing of the calking tool, and to give access to the joints or parts beneath. These flanges remaining on the fitting serve for its attachment to the bowl flange by bolts 4 and nuts 5, and in order to prevent the dropping and loss of these bolts when the nuts are removed, we have shown the following means for securing them in place: Each of the flanges has a semi-circular slot 6 made in it, and at one end the slots are enlarged sufficiently to admit the bolt and a shouldered portion 7 which lies between the screw-threaded portion of the bolt and the head 8. Between this shoulder 7 and the head 8 is a flattened or rectangular portion 9, of less diameter than the shoulder or flange 7 and head 8.

With this construction it will be seen that the bolt can be introduced through the enlarged end of the slot, the flange 7 passing through this enlargement, but the head 8 being large enough not to pass through, the bolt is then slipped along into the segmental channel, and the part 9 substantially fitting this channel, the flange or shoulder 7 projects so that the bolt is confined in the slot in the flange of the fitting, and cannot be removed therefrom without turning the fitting flange or moving the bolt, until the bolt is again in line with the larger portion of the slot or opening. It will thus be seen that the nuts can be safely removed from the upper end of the bolt without danger of the bolt dropping out.

Having thus described our invention, what we claim and desire to secure by Letters Patent is—

1. The combination with a bowl and a soil-pipe, of a ferrule for coupling the bowl to the soil-pipe, the ferrule being of smaller diameter than the soil-pipe, and provided with a flange extending over the top of the soil-pipe, the flange having arc-shaped open portions to permit the introduction of packing between the ferrule and the soil-pipe and means for securing the bowl to the flange of the ferrule.

2. The combination with a bowl and a soil pipe having an enlarged head substantially in line with and at a distance below the bowl, of an extension piece adapted to fit the head of the soil pipe, a screw-threaded sleeve fitting the upper end of the extension piece, and having a flange with arc-shaped open portions to permit the introduction of packing between the extension piece and the soil pipe, and means for securing the bowl to the flange of the connecting sleeve.

3. The combination with a bowl and a soil pipe, of an extension piece for coupling the bowl to the soil pipe, a flange screwed to the extension piece and registering with the base of the bowl, said flange having arc-shaped open portions to permit the introduction of packing between the extension piece and the soil pipe.

4. The combination with a bowl and a soil pipe having an enlarged upper end, of a ferrule for coupling the bowl to the soil pipe, the ferrule being of smaller diameter than the enlarged end of the soil pipe, and provided with a flange extending over the top of the soil-pipe, said flange having arc-shaped open portions to permit the introduction of packing between the ferrule and the soil pipe, and means for securing the bowl to the flange of the ferrule.

In testimony whereof we have hereunto set our hands in presence of two subscribing witnesses.

WILLIAM J. FORSTER.
PERCY M. FORSTER.

Witnesses:
WM. F. LORENZ,
JOHN R. FAIRCHILD.